(12) United States Patent
Wentworth et al.

(10) Patent No.: US 8,505,213 B2
(45) Date of Patent: Aug. 13, 2013

(54) EXTENDABLE NOZZLE FOR A VEHICLE DRYING APPARATUS

(75) Inventors: Robert J. Wentworth, Farmington Hills, MI (US); Lionel Belanger, Northville, MI (US)

(73) Assignee: Motor City Wash Works, Inc., Northville, MI (US)

( * ) Notice: Subject to any disclaimer, the term of this patent is extended or adjusted under 35 U.S.C. 154(b) by 930 days.

(21) Appl. No.: 12/432,890

(22) Filed: Apr. 30, 2009

(65) Prior Publication Data
US 2010/0275459 A1    Nov. 4, 2010

(51) Int. Cl.
*F26B 25/06* (2006.01)
*F26B 3/00* (2006.01)
*B05B 1/32* (2006.01)
*B05B 15/02* (2006.01)

(52) U.S. Cl.
USPC ............ 34/666; 34/222; 34/510; 239/451; 239/456; 239/115

(58) Field of Classification Search
USPC ............ 34/666, 202, 222, 223, 229, 487, 34/510; 15/313, 315; 239/451, 456, 115
See application file for complete search history.

(56) References Cited

U.S. PATENT DOCUMENTS

| | | | | |
|---|---|---|---|---|
| 1,476,830 A | * | 12/1923 | Newell | 138/120 |
| 3,600,224 A | | 8/1971 | Stilwell | |
| 3,903,562 A | * | 9/1975 | Miles | 15/301 |
| 4,969,272 A | | 11/1990 | Schleeter et al. | |
| 4,991,316 A | * | 2/1991 | Crotts | 34/232 |
| 5,048,147 A | * | 9/1991 | Belanger et al. | 15/319 |
| 5,553,346 A | | 9/1996 | McElroy | |
| 6,519,872 B2 | | 2/2003 | McElroy et al. | |
| 6,745,497 B2 | | 6/2004 | McElroy | |
| 7,150,112 B2 | | 12/2006 | Faytlin | |
| 2004/0025371 A1 | * | 2/2004 | Faytlin | 34/666 |

* cited by examiner

*Primary Examiner* — Kenneth Rinehart
*Assistant Examiner* — John McCormack
(74) *Attorney, Agent, or Firm* — Quinn Law Group, PLLC

(57) ABSTRACT

A dryer nozzle for a drying unit in a vehicle wash system includes a nozzle portion for emitting high velocity air to an exterior surface of a vehicle passing thereunder. The nozzle portion has an inner nozzle section and an outer nozzle section. The inner nozzle section and the outer nozzle section being configured such that they can be positioned one inside the other during operation. At least one of the inner nozzle section or the outer nozzle section can be extended and retracted as directed towards or away from the surface of the vehicle.

39 Claims, 5 Drawing Sheets

EXTENDABLE NOZZLE FOR A VEHICLE DRYING APPARATUS

TECHNICAL FIELD

The present invention relates generally to an apparatus for removing water from the surface of a vehicle in a vehicle wash system. More particularly, the present invention relates to an apparatus for removing water from the surface of a vehicle that yields increased drying capabilities as well as improved longevity of the apparatus.

BACKGROUND INFORMATION

Assemblies for blowing liquids from a vehicle surface are well known. An exemplary assembly includes a support plenum for distributing air and a nozzle system, including a nozzle for directing air toward the top surface of a vehicle. Assemblies of these types are well known and have been utilized in the art for many years.

Many such assemblies for blowing liquids (drying) include an air delivery conduit interconnecting the plenum and the nozzle system for delivering air from the plenum to the nozzle system and then to the vehicle exterior. Some assemblies allow the nozzle system to move in an adjustment direction toward and away from the plenum between various-operating positions. Further, other assemblies cause the nozzle to rotate to different directions as the vehicle moves thereby. However, these systems all suffer from operational disadvantages and provide only limited drying capabilities.

Additionally, the nozzles of most drying systems are constructed of a solid hard material such that if a vehicle or other structure contacts them it can cause significant damage. For example, if a vehicle contacts a nozzle of these existing drying systems it can cause damage to the vehicle. Moreover, it can also cause damage to the nozzle or the drying system itself, which would be extremely costly to replace or repair.

It is therefore a need to overcome these disadvantages and provide an improved drying system.

SUMMARY OF THE INVENTION

It is therefore an advantage of the present invention to provide an improved drying system that has a nozzle that can be extended or retracted.

It is another advantage of the present invention is to provide an improved drying system that has a nozzle that extends and retracts to the height of a vehicle passing therebeneath to direct the air stream close to the exterior surface of the vehicle.

It is still another advantage of the present invention to provide an improved drying system that has an extendable and retractable nozzle that is constructed of a pliable material such that it can move or yield if contacted by a vehicle to minimize damage to both the vehicle and the nozzle.

It is yet another advantage of the present invention to provide an improved drying system that keeps air directed closer to a vehicle surface to more effectively blow water off the vehicle exterior.

It is a further advantage of the present invention to provide an improved drying system that increases the length of relative laminar air flow to increase drying efficiency.

In accordance with the above and the other advantages of the present invention, an improved drying system is provided. The system includes a plurality of drying elements, namely at least one forward drying element and a pair of rear drying elements. The system also includes a plurality of sensors that generally map the exterior surface contour of a vehicle passing beneath the drying system. Each of the drying elements includes a nozzle having a first nozzle portion and a second nozzle portion. The first nozzle portion of each drying element is moveable with respect to the second nozzle portion. The second nozzle portion extends and retracts based on feedback from the sensors which detect vehicle height, to provide a high force substantially laminar air flow to the exterior surface of the vehicle to blow water off the exterior and dry the vehicle. The nozzle portions are constructed of a soft pliable material to minimize damage to it or a vehicle in the event of contact between the nozzle and the vehicle.

These and other features and advantages of this invention will become more apparent to those skilled in the art from the detailed description of a preferred embodiment. The drawings that accompany the detailed description are described below.

DETAILED DESCRIPTION

Referring to the Figures, a vehicle washing system in accordance with the present invention is illustrated and generally designated by reference number 10. The vehicle washing system includes a vehicle treatment apparatus. In the embodiments shown and described, the vehicle treatment apparatus is a dryer or drying device that is utilized to blow water off of a vehicle exterior as part of the vehicle washing process. It will be understood by one of ordinary skill in the art that air is emitted from the vehicle treatment apparatus to blow water off the vehicle exterior. In accordance with a preferred embodiment, high pressure air is emitted from the device. Additionally, the air can be heated when emitted or may instead be ambient air. The vehicle treatment apparatus is illustrated as disposed above the vehicle to emit air to the upper surface of the vehicle. However, it will be understood that the vehicle treatment apparatus could be oriented to primarily contact other portions of the vehicle.

Figure 1:
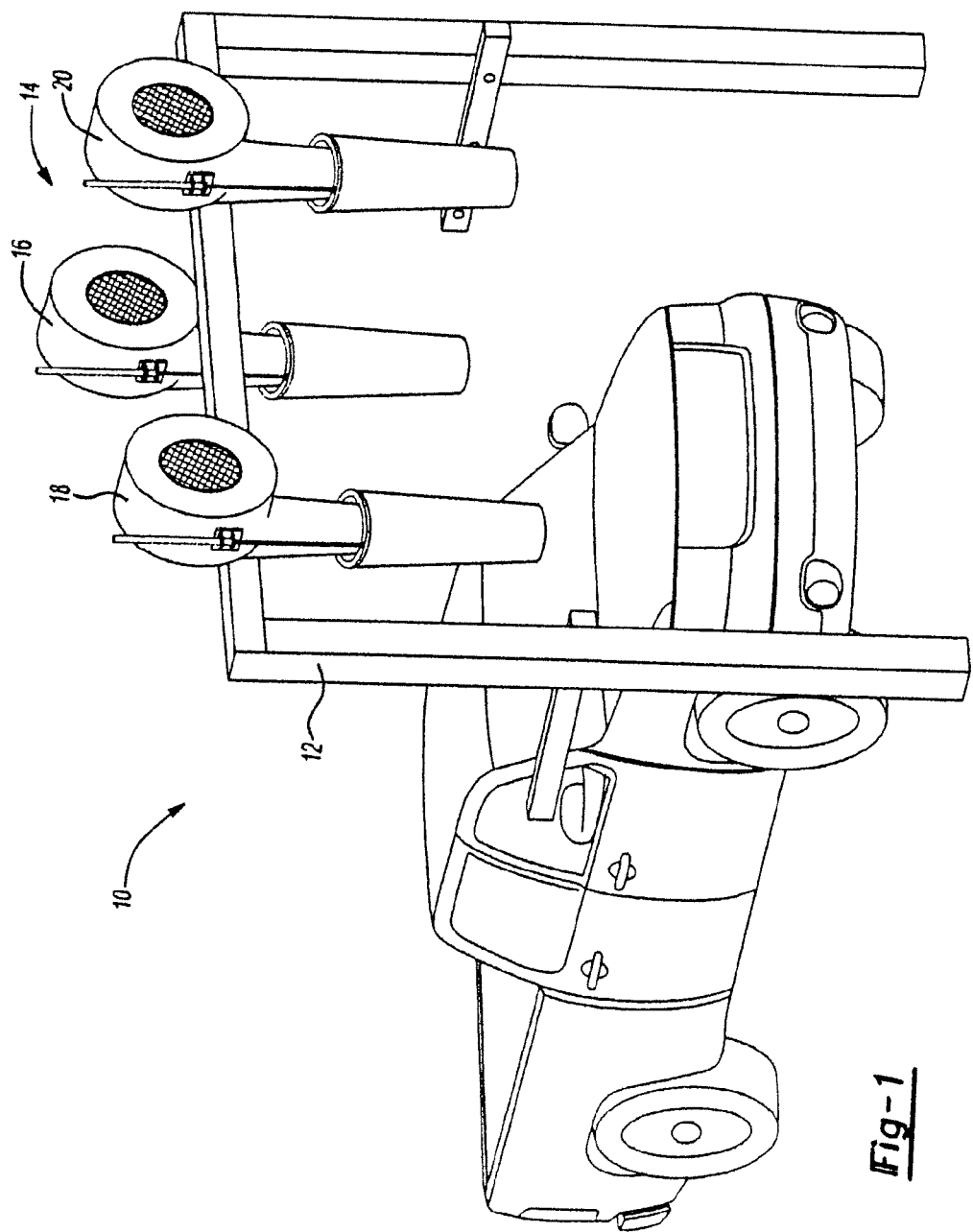
FIG. 1 is a perspective view of a drying system in accordance with a preferred embodiment of the present invention.

As shown in FIG. 1, the vehicle washing system 10 includes a frame 12 upon which various vehicle treatment apparatus are disposed. The vehicle treatment apparatus act on a vehicle 5 as it passes within or through the frame 12 to accomplish the various steps of the vehicle wash process. One of the vehicle treatment apparatus disposed on the frame 12 is a drying system 14. In accordance with the preferred embodiment, the drying system 14 blows water off the exterior surface of a vehicle as it passes thereby. The preferred drying system 14 is coupled to the frame 12 such that it is disposed above the upper surface of the vehicle. The drying system 14 preferably includes three individual drying units 16, 18, 20, which operate together to perform the drying process, as discussed in more detail below. It will be appreciated, however, that the drying system 14 can include more or less drying units as required.

Each of the drying units 16, 18, 20 have the same configuration and thus the structure of only one is described in detail herein. Specifically, the drying unit 16 has a blower 22, which includes a blower housing 24 and a fan or impeller 26 disposed therein. The fan 26 rotates to draw air into the blower housing 24 and then forces it at a high velocity out of a housing exit 28. The blower 24 is in communication with a power source to effectuate rotation of the fan 26, as is well known in the art. Further, the blower 24 is actuated by a control system that is part of the vehicle wash system such that it is turned on and off as required. Additionally, the blower 22 can be in communication with a heater or other heating device to heat the air such that warm or heated air exists the blower housing 24 through the housing exit 28.

A nozzle portion 30 is secured to the blower housing 24 such that its upper end 32 is disposed around the housing exit 28. This configuration ensures that air emitted through the housing exit 28 enters the nozzle portion 30. As shown, the nozzle portion 30 preferably has an upper nozzle portion 34 and a lower nozzle portion 36. The upper nozzle portion 34 has a top end 38 that is secured around the housing exit 28. In accordance with one embodiment, the upper nozzle portion 34 has a slight conical shape such that a bottom end 40 of the upper nozzle portion 34 has a smaller diameter than the top end 38 of the upper nozzle portion 34. The lower nozzle portion 36 has a top end 42 and a bottom end 44. The top end 42 of the lower nozzle portion 36 has a larger diameter than the bottom end 40 of the upper nozzle portion 34, such that the lower nozzle portion 36 surrounds the upper nozzle portion 34. The lower nozzle portion 36 also preferably has a slight conical shape. Alternatively, each of the nozzle portions 34, 36 can be cylindrical in shape or can have a variety of other shapes. The lower nozzle portion 36 preferably has a larger diameter than the upper nozzle portion 34.

Figure 2:
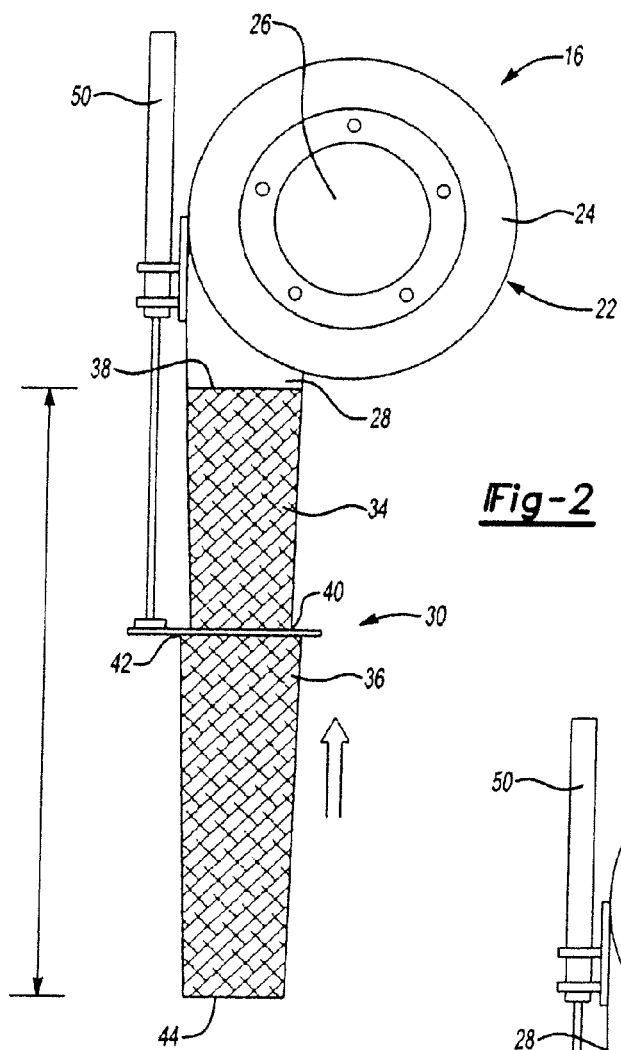
FIG. 2 is a side view a drying apparatus with a nozzle of one dryer of the drying system in an extended position in accordance with a preferred embodiment of the present invention.
Figure 3:
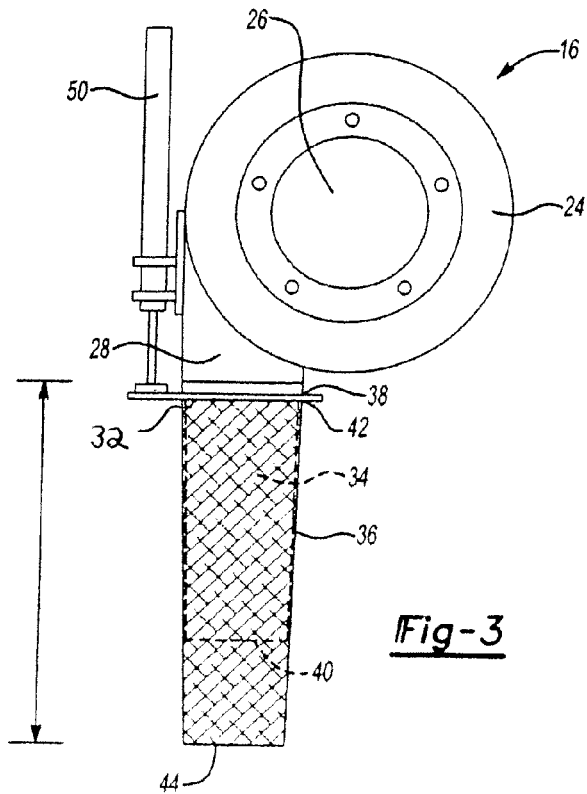
FIG. 3 is a side view of a drying apparatus with a nozzle of one dryer of the drying system in a retracted position in accordance with a preferred embodiment of the present invention.

As shown, the lower nozzle portion 36 is coupled to the blower housing 24 by a cylinder 50, such as a pneumatic cylinder. This connection allows the lower nozzle portion 36 to be raised and lowered with respect to a vehicle during the drying process, as discussed in detail below. FIG. 2 illustrates the lower nozzle portion 36 in a fully extended position such that the bottom end 44 is disposed relatively closer to the exterior surface of the vehicle such that the emitted air is more properly directed to the vehicle exterior and contacts that area at an increased force. In this position, the top end 42 of the lower nozzle portion 36 encompasses the bottom end 44 of the upper nozzle portion 34 to ensure that the air is directed out the bottom end 44 of the lower nozzle portion 36. FIG. 3 illustrates the lower nozzle portion 36 in a fully retracted position such that the bottom end 40 is raised up with respect to a vehicle to accommodate a higher vehicle exterior surface. In this position, the upper nozzle portion 34 and the lower nozzle portion 36 are in telescopic engagement with the lower nozzle portion 36 to surround the entirety of the upper nozzle portion 34 when it is retracted.

The retraction and extension of the lower nozzle portion 36 is accomplished by the cylinder 50, which is in communication with the control system to raise and lower it as directed. In the preferred embodiment, the lower nozzle portion 36 only includes two positions, namely a fully retracted position and a fully extended position. However, it will be understood that the control system can be configured to allow the cylinder 50 to position the lower nozzle portion 36 at a variety of different heights and positions with respect to the vehicle exterior, as needed, i.e. partially lowered or retracted.

FIGS. 4 through 8 illustrate the operation of the drying system 14 of the present invention as incorporated into a vehicle wash system 10 for drying a vehicle passing therethrough. The present drying system 14 can be incorporated into any known vehicle wash system, including tunnel car washes or roll-over car washes. After a vehicle has passed through the rinse and wash portions of the vehicle wash process, it encounters the drying system 14 as it travels along the conveyer. In accordance with the present invention, the drying system 14, includes three drying units 16, 18, 20. The drying unit 16 is positioned forward (will encounter the vehicle first) while the drying units 18, 20 are disposed rearwardly of the drying unit 16. The drying unit 16 is positioned on the frame 12 such that it is intended to overlie the center of the vehicle so that air emitted therefrom generally contacts the center of the vehicle as well as portions on either side thereof. The drying units 18, 20 are disposed outwardly (away from the center of the vehicle) of the drying unit 16 and are intended to overlie the sides of the vehicle and emit air to the side portions of the upper surface of the vehicle as well as the side portions of the vehicle. Thus, in operation, the forward drying unit 16 blows high speed air onto the exterior surface of the vehicle to blow off any water that is located in the middle of the vehicle as well as the areas a couple feet on either side of the vehicle center to leave a dry section. The rear drying units 18, 20 then blow off the remaining water located on the exterior surface closer to the sides off of the vehicle as well as any water located on the sides of the vehicle.

The drying system 14 also includes a plurality of sensors located on either side of the frame 12 through which the vehicle passes. As shown, the preferred embodiment preferably includes three sets of sensors 52, 54, 56 located on the frame 12. The sensors are preferably photo eyes. However, other suitable types of sensors, such as Sonar sensors, may instead be utilized. Each set of sensors 52, 54, 56 preferably include a pair of sensors with each sensor positioned on opposite sides of the frame 12 from one another with each sensor set spaced apart from another along the length of the frame. Each sensor set 52, 54, 56 is intended to determine whether or not clear visual contact exists between the sensors of each set. The control system is in communication with the sensor sets 52, 54, 56 to monitor this condition throughout the vehicle drying process. In the event, the line of sight is broken or interrupted between the sensors of any set 52, 54, 56, i.e. a vehicle passes therebetween, this condition is also sensed by the control system. The sets of sensors 52, 54, 56 are preferably located forwardly of the individual drying units 16, 18, 20 to properly control their operation.

Figure 4:
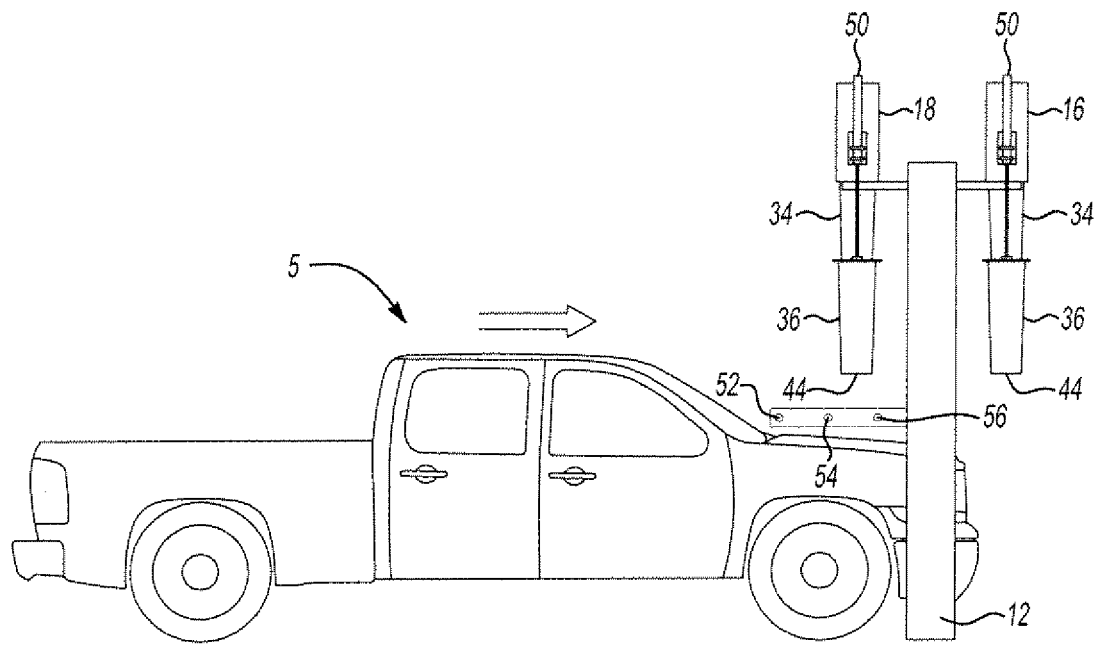
FIG. 4 is a schematic illustration of a drying system with a vehicle passing therethrough in a first position in accordance with a preferred embodiment of the present invention.

In accordance with the preferred embodiment, the lower nozzle portions 36 of each of the drying units 16, 18, 20 is in the normal extended position. As the vehicle enters the drying system 14 as shown in FIG. 4, the hood of the vehicle is positioned beneath the first sensor set 52 and thus the line of sight between the individual sensors is not interrupted. Thus, all three drying units 16, 18, 20 remain in the extended position and are closer to the exterior surface of the vehicle to provide increased drying efficiency. This extended nozzle position delivers relatively focused laminar air to the exterior surface of the vehicle and better drying as a higher force of air is provided to the desired area. This is compared to other drying systems where the nozzles are located further from the exterior surface of the vehicle and thus the air emitted therefrom expands and becomes turbulent and does not encounter the vehicle with the same force as the dryer of the disclosed drying system 14 and thus provides decreased drying capabilities. It will also be understood that some vehicles have higher hood heights and thus will break the communication between the sensors of the first, second, and third sets of sensors, thereby causing the lower nozzle portions 36 to be retracted when the vehicle is in this position shown in FIG. 4. The forward drying unit 16 is positioned to blow water off the middle portion of the vehicle (with reference to the direction of travel) while the rear drying units 18, 20 blow the water of the side portions of the vehicle.

Figure 5:
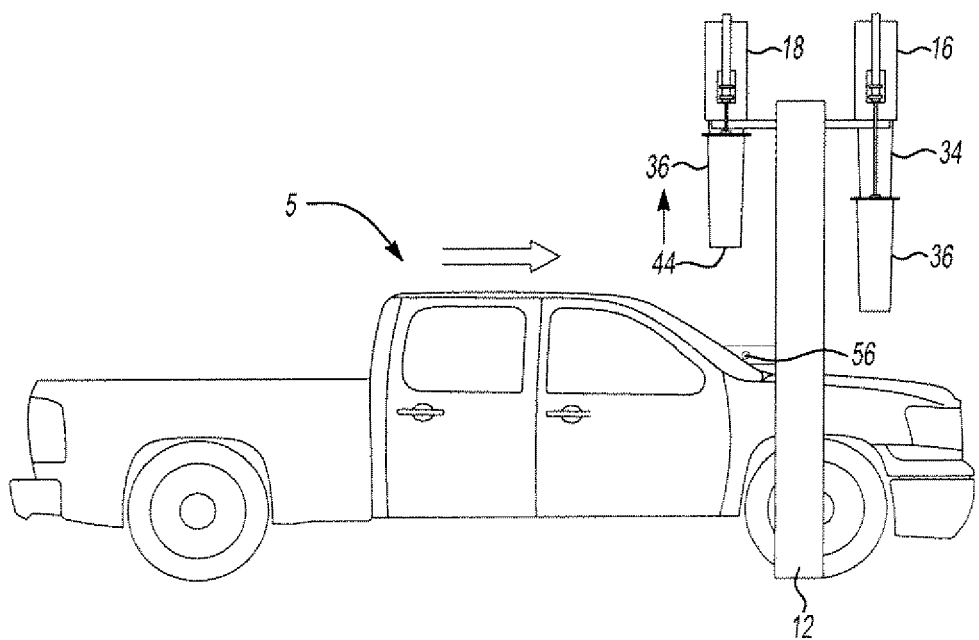
FIG. 5 is a schematic illustration of a drying system with a vehicle passing therethrough in a second position in accordance with a preferred embodiment of the present invention.

As shown in FIG. 5, as the vehicle continues forward through the drying system 14, the increased height of the car will break the line of sight between the first set of sensors 52. As the vehicle continues to travel, it will break the line of sight between the second set of sensors 54. When the line of sight to both sensor sets is broken, the control system will send a signal to the cylinder 50 associated with the forward drying unit 16 to cause it to raise the lower nozzle portion 36. The lower nozzle portion 36 of the forward drying unit 16 is thus raised to blow water off the windshield. In this position, the lower nozzle portion 36 of the rear drying units 18, are still in the lowered positions to blow water off the side areas of the hood.

Figure 6:
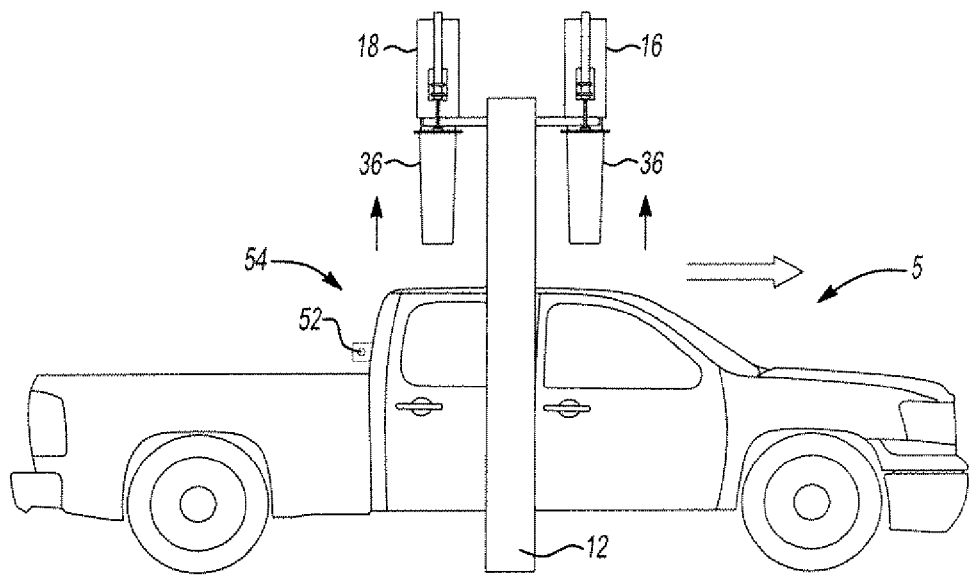
FIG. 6 is a schematic illustration of a drying system with a vehicle passing therethrough in a third position in accordance with a preferred embodiment of the present invention.

Next, as shown in FIG. 6, as the vehicle breaks the line of sight with the third set of sensors 56, such that all three sets of sensors have interrupted the line of sight, the rear drying units 18, 20 are retracted by their respective cylinders 50 based on signals received from the control system. In this position, the drying units each can blow water off the roof of the vehicle. The drying unit 16 remains in the retracted position even if the first sensor set 52 line of sight is reestablished.

Figure 7:
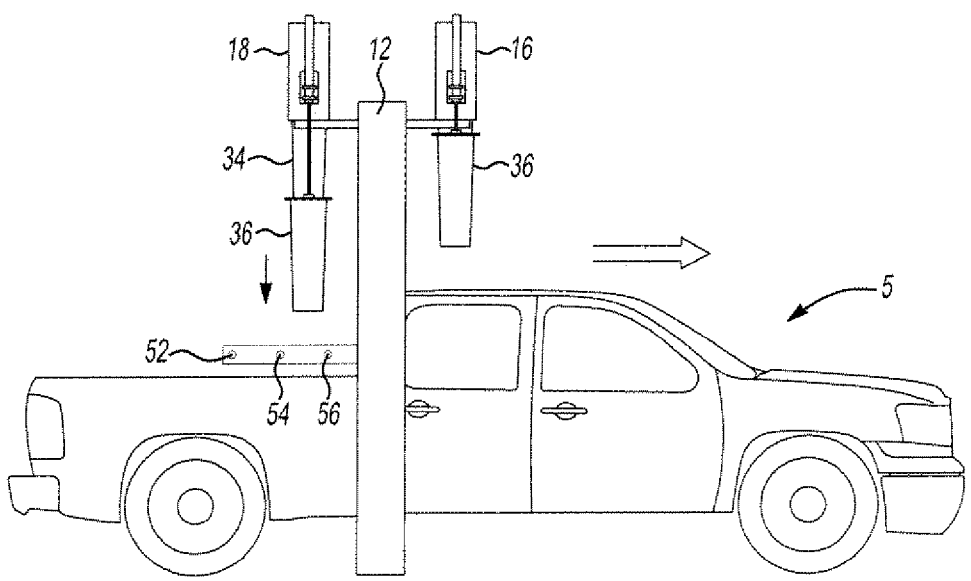
FIG. 7 is a schematic illustration of a drying system with a vehicle passing therethrough in a fourth position in accordance with a preferred embodiment of the present invention.

As the vehicle continues its motion forwardly, and its height decreases, the line of sight of both the first set of sensors 52 and the second set of sensors 54 is reestablished, as shown in FIG. 7. In this position, the forward drying unit 16 is lowered to the extended position to blow air off the rear window and back of the vehicle. The rear drying units 18, 20 remain in the retracted position.

Figure 8:
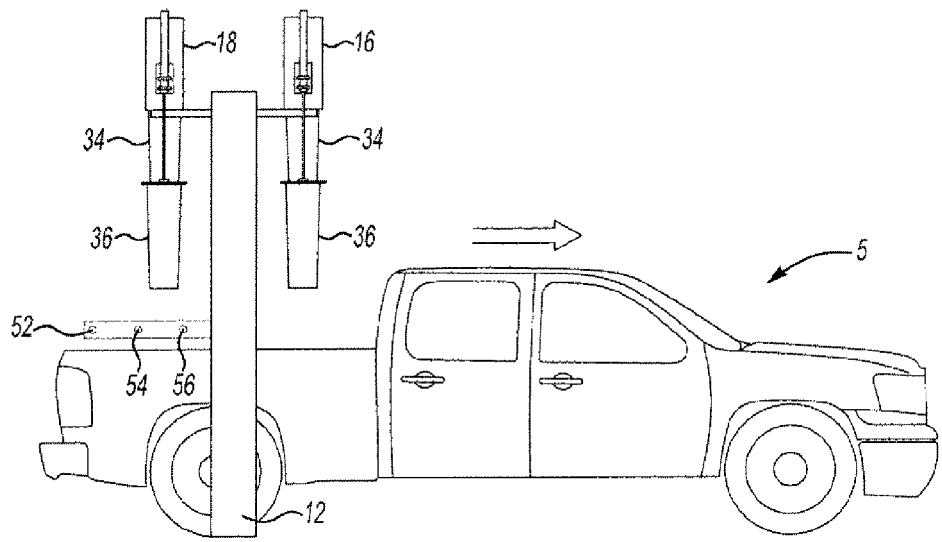
FIG. 8 is a schematic illustration of a drying system with a vehicle passing therethrough in a fifth position in accordance with a preferred embodiment of the present invention.

As shown in FIG. 8, as the vehicle progresses, and the second set of sensors 54 and the third set of sensors 56 have unblocked line of sight, the rear drying units 18, 20 are also lowered. In accordance with the present invention, two adjacent sets of sensors must have visible line of sight for a drying unit to be lowered to the extended position. It will also be understood that more or less sensor sets may be utilized and that a variety of other control methods for raising and lowering the nozzles can be utilized. The drying units remain in the extended position until the next vehicle approaches the drying system 14 and then the same process is repeated.

Figure 9:
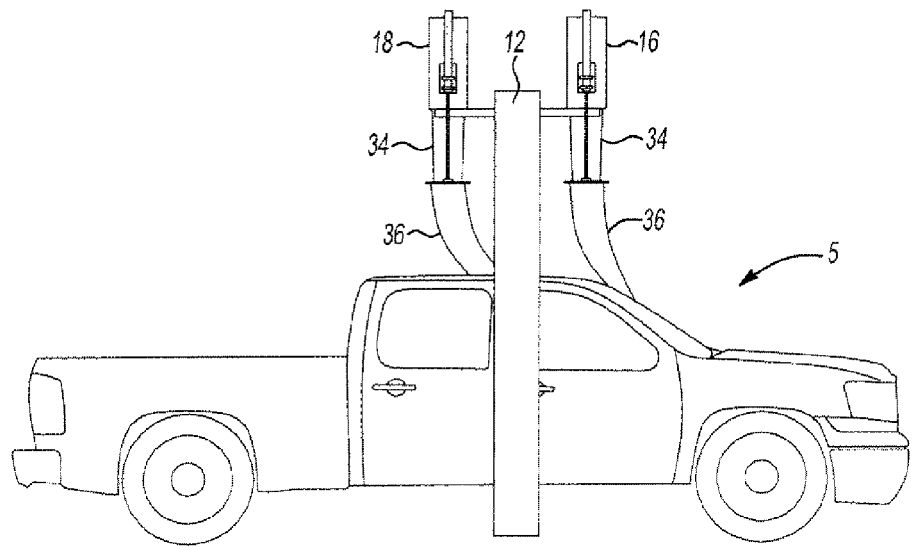
FIG. 9 is a schematic illustration of a drying system with a vehicle in contact with nozzle in accordance with a preferred embodiment of the present invention.

Referring now to FIG. 9, a vehicle is illustrated as contacting the nozzle portion 30 of a drying unit. In a preferred embodiment, the nozzle portion 30 is constructed of a fabric material that is relatively compliant or soft. The material is preferably non-absorbent. This relatively soft material allows the nozzle portion to bend, collapse or move if contacted by a portion of a vehicle or other object. This prevents damage to either the nozzle or the vehicle. After the vehicle or other object contacts the nozzle portion 30, it returns to its normal position, either on its own or when air is forced therethrough. It will be appreciated that a variety of other flexible materials can be utilized that allow the nozzle portion 30 to bend or move away to prevent damage to the nozzle structure of the vehicle. In fact, the nozzle structure can be positioned to travel along an upper surface of the vehicle and due to its flexible composition will not cause any damage.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A dryer nozzle for a drying unit in a vehicle process system, comprising:
a nozzle portion for emitting high velocity air to an exterior surface of a vehicle passing thereunder;
said nozzle portion having an upper nozzle section and lower nozzle section, said upper nozzle section and said lower nozzle section configured such that they can be positioned one inside the other during operation;
said lower nozzle section having an exterior upper end that is connected to a bottom portion of an actuator so as to extend and retract said lower nozzle section with respect to said upper nozzle section as directed towards or away from said exterior surface of the vehicle, such that when said lower nozzle section is retracted away from said exterior surface of said vehicle, said upper nozzle section is telescopically disposed within said lower nozzle section.

2. The dryer nozzle of claim 1, wherein said high velocity air is emitted onto said exterior surface of the vehicle in a nominally laminar stream.

3. The dryer nozzle of claim 1, wherein at least one of said upper nozzle section or said lower nozzle section is constructed of a compliant material that readily deforms if contacted by the vehicle to minimize any damage to the vehicle.

4. The dryer nozzle of claim 3, wherein both said upper nozzle section and said lower nozzle section are constructed of a compliant material that readily deforms if contacted by the vehicle to minimize any damage to the vehicle.

5. The dryer nozzle of claim 4, wherein at least one of said upper nozzle section or said lower nozzle section has a generally cone-shape.

6. The dryer nozzle of claim 1, wherein said actuator is a cylinder.

7. The dryer nozzle of claim 1, wherein a top portion of said actuator is secured to a blower of the drying unit.

8. The dryer nozzle of claim 3, wherein said compliant material is a non-absorbent fabric.

9. The dryer nozzle of claim 1, wherein said dryer unit is part of a drying system, comprising:
a plurality of drying units each having a dryer nozzle, said plurality of units positioned to operate together to blow water off said exterior of the vehicle.

10. The dryer nozzle of claim 9, wherein said drying system includes a forward drying unit and a pair of rearward drying units, said pair of rearward drying units being disposed outwardly with respect to said forward drying unit, such that said dryer nozzle of said forward drying unit pushes water away from a center of said vehicle exterior outwardly and said pair of rearward drying units push the remaining water off said exterior of the vehicle.

11. The dryer nozzle of claim 1, wherein said nozzle portion is in communication with a sensor, which determines a distance from said exterior surface of the vehicle to effectuate extension and refraction of said lower nozzle section.

12. The drying system of claim 11, wherein said nozzle portion is in communication with a plurality of sensors.

13. The drying system of claim 11, wherein said sensor is a photo eye.

14. A drying system for a vehicle process system, comprising:
a drying unit including a housing portion and a nozzle portion;
said housing portion for generating a supply of high velocity air;
said nozzle portion for emitting a stream of high velocity air to an exterior of a vehicle passing thereunder;
said nozzle portion having an upper nozzle section and a lower nozzle section, said upper nozzle section and said lower nozzle section configured such that said upper nozzle section can be telescopically disposed within said lower nozzle section during operation, at least said lower nozzle section being formed of a flexible material;
wherein said lower nozzle section can be extended and retracted with respect to said upper nozzle section as directed towards or away from said exterior surface of the vehicle to accurately deliver said stream of high velocity air to said vehicle exterior;
an upper end of said lower nozzle section being open to air surrounding the drying system such that air can enter said lower nozzle section and can be emitted to said vehicle exterior without passing through said housing portion.

15. The drying system of claim 14, wherein said stream of high velocity air emitted to said vehicle exterior is substantially laminar.

16. The drying system of claim 14, wherein both said upper nozzle section and said lower nozzle section are constructed of a compliant material that readily deforms if contacted by the vehicle to minimize any damage to the vehicle.

17. The drying system of claim 14, wherein at least one of said upper nozzle section or said lower nozzle section has a generally cone-shape.

18. The drying system of claim 14, wherein said lower nozzle section is extended and refracted by an actuator.

19. The drying system of claim 18, wherein said actuator is a cylinder.

20. The drying system of claim 18, wherein said actuator is secured at one end to a blower of the drying unit and another end to said lower nozzle section.

21. The drying system of claim 14, wherein said compliant material is a non-absorbent fabric.

22. The drying system of claim 14, wherein said drying unit is part of a drying system, comprising:
a plurality of drying units each having a dryer nozzle, said plurality of units positioned to operate together to blow water off said exterior of the vehicle.

23. The drying system of claim 22, wherein said drying system includes a forward drying unit and a pair of rearward drying units, said pair of rearward drying units being disposed outwardly with respect to said forward drying unit, such that said dryer nozzle of said forward drying unit pushes water away from a center of said vehicle exterior outwardly and said pair of rearward drying units push the remaining water off said exterior of the vehicle.

24. The drying system of claim 14, wherein said nozzle portion is in communication with a sensor, which determines a distance from said exterior surface of the vehicle to effectuate extending and refraction of said lower nozzle section.

25. The drying system of claim 24, wherein said nozzle section is in communication with a plurality of sensors.

26. The drying system of claim 24, wherein said sensor is a photo eye.

27. A drying system for a vehicle process system, comprising:
a first drying unit generally disposed over a center portion of a vehicle passing through the vehicle wash system to blow water off said center portion;
a pair of drying units located rearwardly of said first drying unit; each of said pair of rearward drying units located outwardly from said center portion of said vehicle to blow water off side portions of said vehicle;
each of said drying units having a downwardly extending nozzle portion that delivers high velocity air to said vehicle to dry said exterior thereof;
each of said nozzle portions including an upper section and a lower section that are configured such that said upper section can be telescopically positioned inside said lower section, said upper sections and said lower sections of said nozzle portions do not form an air tight seal such that air external to the drying systems can be drawn directly into said lower nozzle portions as said high velocity air is delivered to said exterior surface of the vehicle;
wherein said lower section of said nozzle portions can be extended and retracted with respect to said upper nozzle section as directed towards or away from said exterior surface of the vehicle.

28. The drying system of claim 27, wherein said stream of high velocity air emitted to said vehicle exterior is substantially laminar.

29. The drying system of claim 27, wherein at least one of said upper section or said lower section is constructed of a compliant material that readily deforms if contacted by the vehicle to minimize any damage to the vehicle.

30. The drying system of claim 29, wherein both said upper section and said lower section are constructed of a compliant material that readily deforms if contacted by the vehicle to minimize any damage to the vehicle.

31. The drying system of claim 29, wherein said upper section and said lower section each have a generally cone-shape.

32. The drying system of claim 27, wherein said lower section is extended and retracted by an actuator.

33. The drying system of claim 32, wherein said actuator is a cylinder.

34. The drying system of claim 32, wherein said actuator is secured at one end to a blower of the drying unit and another end to said outer section.

35. The drying system of claim 29, wherein said compliant material is a non-absorbent fabric.

36. The drying system of claim 32, wherein said first drying unit pushes water away from a center of said vehicle exterior outwardly and said pair of rearward drying units push the remaining water off said exterior of the vehicle.

37. The drying system of claim 27, wherein said nozzle portion is in communication with a sensor, which determines a distance from said exterior surface of the vehicle to effectuate extending and retraction of said of said lower nozzle section.

38. The drying system of claim 37, wherein said nozzle portion is in communication with a plurality of sensors.

39. The drying system of claim 38, wherein said sensor is a photo eye.

\* \* \* \* \*